(12) United States Patent
Brandstetter

(10) Patent No.: US 10,289,645 B2
(45) Date of Patent: *May 14, 2019

(54) SYSTEMS AND METHODS FOR PROVIDING EXPERT THREAD SEARCH RESULTS

(71) Applicant: Jeffrey D. Brandstetter, San Francisco, CA (US)

(72) Inventor: Jeffrey D. Brandstetter, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,516

(22) Filed: Feb. 27, 2015

(65) Prior Publication Data

US 2015/0169770 A1   Jun. 18, 2015

Related U.S. Application Data

(63) Continuation of application No. 14/147,086, filed on Jan. 3, 2014, now Pat. No. 9,002,837.

(60) Provisional application No. 61/789,569, filed on Mar. 15, 2013.

(51) Int. Cl.
*G06F 16/951* (2019.01)
*G06F 16/9535* (2019.01)

(52) U.S. Cl.
CPC ........ *G06F 16/951* (2019.01); *G06F 16/9535* (2019.01)

(58) Field of Classification Search
CPC ......... G06F 17/30864; G06F 17/30867; G06F 17/3053; G06F 17/30696; G06F 17/30554
USPC ....... 707/707, 723, 728, 748, 752, 769, 770, 707/805
See application file for complete search history.

(56) References Cited

U.S. PATENT DOCUMENTS

| | | | |
|---|---|---|---|
| 9,002,837 B2 * | 4/2015 | Brandstetter | 707/723 |
| 2005/0234959 A1 * | 10/2005 | Ronnewinkel | G06Q 10/10 |
| 2008/0215541 A1 * | 9/2008 | Li | G06F 16/951 |
| 2009/0320021 A1 * | 12/2009 | Pan | G06F 11/0715 718/100 |

* cited by examiner

*Primary Examiner* — Jean B Fleurantin
(74) *Attorney, Agent, or Firm* — Jones Day

(57) ABSTRACT

Systems and methods are provided for providing search results. An expert search thread associated with a search term is received. A first query from a first user based on the search term is received, and a set of results to the first query is provided, where the set of results includes the expert search thread. A credibility score is determined for the expert search thread. A second query is received from a second user based on the search term. A placement of the expert search thread in a set of results for the second query is determined based on the credibility score for the expert search thread, and the set of results for the second query is provided to the second user.

40 Claims, 9 Drawing Sheets

1. LIST MODE:
    EXPERT 1's SEARCH THREAD:
        1ST LINK
        2ND LINK
        3RD LINK
        4TH LINK
        5TH LINK
        6TH LINK
        7TH LINK
        8TH LINK
    EXPERT 2's SEARCH THREAD:
        1ST LINK
        2ND LINK
        3RD LINK
        4TH LINK
        5TH LINK
        6TH LINK
    EXPERT 3's SEARCH THREAD:
        1ST LINK
        2ND LINK
        3RD LINK
        4TH LINK
        5TH LINK
        6TH LINK
        7TH LINK
        8TH LINK
        9TH LINK
        10TH LINK
        11TH LINK
        12TH LINK

Fig. 2A

2. GRAPHIC MODES:

A. BREADCRUMB FORMAT:

EXPERT 1's SEARCH THREAD:
   1ST LINK > 2ND LINK > 3RD LINK > 4TH LINK > 5TH LINK > 6TH LINK > 7TH LINK > 8TH LINK

EXPERT 2's SEARCH THREAD:
   1ST LINK > 2ND LINK > 3RD LINK > 4TH LINK > 5TH LINK

EXPERT 3's SEARCH THREAD:
   1ST LINK > 2ND LINK > 3RD LINK > 4TH LINK > 5TH LINK > 6TH LINK > 7TH LINK

*Fig. 2B*

B. FLOWCHART FORMAT:
   EXPERT 1's SEARCH THREAD:
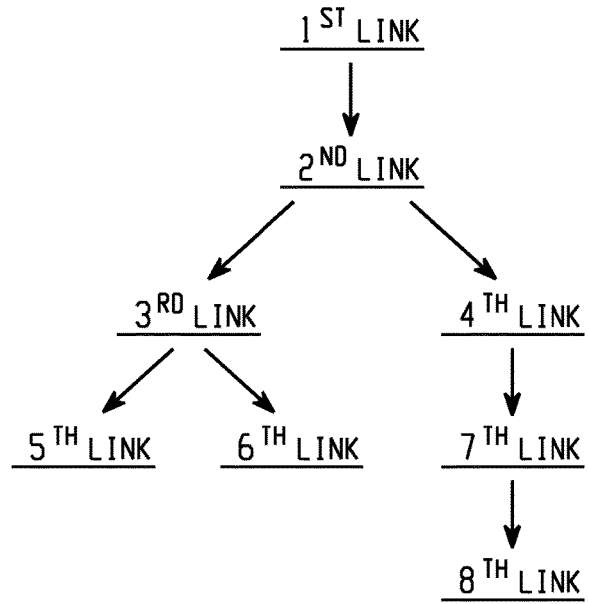
EXPERT 2's SEARCH THREAD:
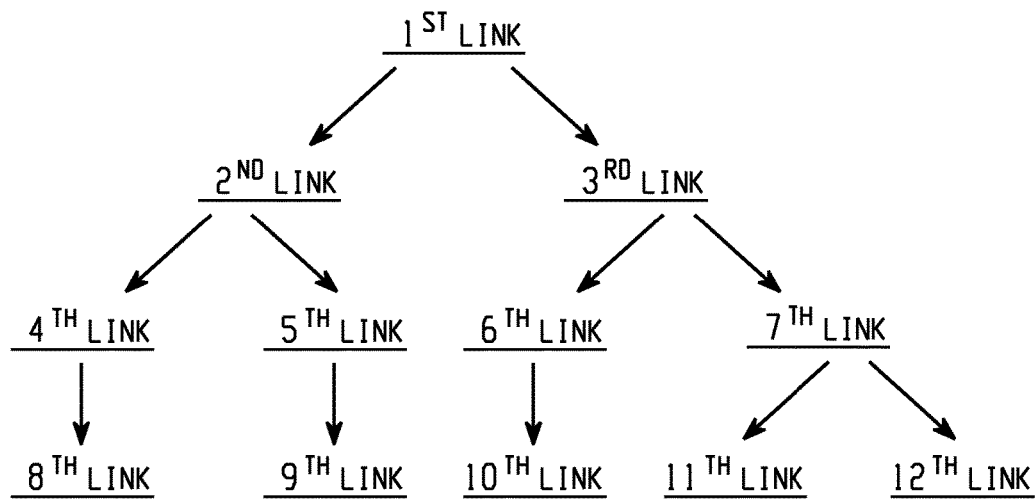
*Fig. 2C*

You Search Images Maps Play YouTube News Gmail Drive Calendar More ▽

| "copyright law" "scenes a|faire" | □ | Sign in |

Web  Images  Maps  Shopping  More ▽    Search Tools

About 41,200 results (0.21 seconds)

Scenes a faire - Wikipedia, the free encyclopedia
en.wikipedia.org/wiki/Scenes_a_faire
In the U.S. it also refers to a principle in copyright law in which certain elements of a
creative work are held to be not...Scenes a Faire Under Copyright Law.

Scenes A Faire Under Copyright Law
www.ivanhoffman.com/scenes.html
The loose definition of scenes a faire refers to situations in which there is essentially
no other way to express a particular idea except by using ceratin elements...

[PDF] Software and scenes a faire - Jones Day
www.jonesday.com/files/...011-013-CW-May09-Feat.pdf
File Format: PDF/Adobe Acrobat
Introduced into copyright law more than 75 years ago in a decision involving scenes
from a movie titled When Tomorrow Comes.1 At its most general, the...

Scenes A Faire Definition
www.duhaime.org>Legal Dictionary
Scenes a faire, sequences of events which necessarily follow from a common...
Duhaime, Lloyd. Copyright Law; Duhaime, Lloyd. Intellectual and Internet Law...

Copyright, Originality, and the End of the Scenes a Faire and Merger....
https://litigation-essentials.lexisnexis.com/.../app?....
by MD Murray - 2006 - Cited by 17 - Related articles
Part II will describe the merger doctrine and scenes a faire doctrine that fall under the
requirement of originality in the United States copyright law and explain the...

MATCH TO FIG.3B

MATCH TO FIG. 3A

[PDF] Wake Forest - Journal of Business & Intellectual Property Law
ipjournal.law.wfu.edu/Files/2009/09/article.8.128.pdf
File Format: PDF/Adobe Acrobat - Quick View
by TAQP Quo - Cited by 3 - Related Articles
Scenes A Faire as the Second Tool of...Burden of Proof in Cases of Merger and
Scenes a Faire...One of the least clearly defined concepts in copyright law is...

Scenes a Faire Law & Legal Definition
definitions.uslegal.com > Legal Definitions Home S
The phrase is commonly used in copyright law...except by using certain elements and
in such instances, those elements will often be termed "scenes a faire."...

Doctrine of Merger or "scenes a faire" doctrine under Copyri| Free...
www.freelegaladvisors.com/blogs/?p-624
Nov. 29, 2012 - Doctrine of Merger or "scenes a faire" doctrine under Copyright Law. It
is the cardinal principle of copyright law that the idea is not copyrightable....

Scenes a faire : Seattle Copyright Watch : Washington Intellectual...
www.seattlecopyrightwatch.com/copyright/scenes-a-faire/
Jun 9, 2011 - Plaintif's drawings are scenes a faire (a standard feature). Scope of
protection...Useful articles are not protected by copyright law. Substantial....

Concurring Opinions >> What's a Scenes a Faire?
www.concurringopinions.com/archives/.../whats-a-scenes-a-faire.html...
Mar 1, 2013 - Traditional copyright law is full of doctrines that appear to make sense
from a distance but...They are what the French call "scenes a faire".

Ads related to "copyright law" "scenes a faire"

Register a Trademark $149
www.thetrademarkcompany.com/
Register a Trademark in 5 Minutes! Have Questions? Call 800-906-8626.
Free to Get Started (800) 906-8626 - Customer Testimonials Copyright in 3 Easy Steps
www.legalzoom.com/Copyright

SYSTEMS AND METHODS FOR PROVIDING EXPERT THREAD SEARCH RESULTS

CROSS-REFERENCE TO RELATED APPLICATIONS

This application is a continuation of U.S. patent application Ser. No. 14/147,086, filed on Jan. 3, 2014, and entitled "Systems and Methods for Providing Expert Thread Search Results," the entirety of which is herein incorporated by reference. This application claims priority to U.S. Provisional Application No. 61/789,569, filed on Mar. 15, 2013, and entitled "Systems and Methods for Providing Expert Thread Search Results," the entirety of which is herein incorporated by reference.

TECHNICAL FIELD

This document relates generally to search and more particularly to the use of search threads to augment search results.

BACKGROUND

In an effort to increase the relevancy of search results, current search algorithms compile vast amounts of data regarding which websites receive the most user traffic in response to various search terms and keywords input by users in connection with search queries, including closely-related search terms and keywords and combinations thereof, and then rank and display the results of those data compilations, often in descending order from the most visited websites in connection with such search terms and keywords to the least visited websites. But just because it can be counted doesn't mean it counts. As anyone who has performed even the most cursory search knows all too well, this approach often yields literally thousands of irrelevant search results in response to a search query, with no guidance offered whatsoever as to how best to "drill down" into a particular subject or topic, the optimal order in which to view each search result, etc.

SUMMARY

Systems and methods are provided for providing search results. In a method for providing search results, an expert search thread associated with a search term is received. A first query from a first user based on the search term is received, and a set of results to the first query is provided, where the set of results includes the expert search thread.

As another example, a system for providing search results includes one or more data processors and one or more computer-readable memories encoded with instructions for commanding the one or more data processors to execute steps. In the steps, an expert search thread associated with a search term is received. A first query from a first user based on the search term is received, and a set of results to the first query is provided, where the set of results includes the expert search thread.

As a further example, a computer-readable medium encoded with instructions for commanding one or more data processors to execute steps of a method for providing search results. In the method, an expert search thread associated with a search term is received. A first query from a first user based on the search term is received, and a set of results to the first query is provided, where the set of results includes the expert search thread.

BRIEF DESCRIPTION OF THE DRAWINGS

FIGS. 2A-2D depict example organizations of search results.

FIGS. 3A and 3B depict an example display of search results.

DETAILED DESCRIPTION

The key to improving search is navigation, something best done by an expert or at least someone with considerably more familiarity about a given topic or subject matter than most other users. As noted above, current state of the art search focuses on a "wisdom of the masses" approach by creating algorithms that rank search results according to those sites most frequently visited in connection with various search terms and keywords, related search terms and keywords, and combinations thereof. By contrast, a navigation-based approach to search, as described herein, focuses on the "wisdom of the experts" by tracking the search threads of designated "experts" (i.e., individuals with considerably more familiarity about a given topic or subject matter than most other users), and displaying those search threads as part of the search results returned to other users whenever the same or related search terms or keywords are used by other users in connection with their particular search(es). These experts, who essentially perform a curator function by helping to guide others less knowledgeable about a particular topic or subject matter through the maze of search results returned in any search, are designated as experts using algorithms similar to those currently employed in returning the search results themselves (i.e., through a crowdsourcing/wisdom of the crowd approach, whereby those experts whose search threads are most often followed by other users rank higher in terms of their "expertise" about a given topic or subject matter than those who are less popular among other users). The search threads of these experts are then displayed (e.g., in descending order from the highest ranking to the lowest) together with search term/keyword search results, thereby augmenting the search results displayed in response to a user's search query by offering expert navigation of the particular topic or subject matter searched by such user.

Providing a means of both capturing and displaying for other users the search threads of experts will result in a superior (or at least decidedly improved) system and method of search by adding elements beyond mere data compilation. Augmenting search results with the search threads of experts and other knowledgeable individuals (as determined through a crowdsourcing/wisdom of the crowd approach) will result in improved search because it is search guided or navigated by experts, as opposed to the proverbial "blind leading the blind" system/method currently employed whereby organic search results (apart from paid or sponsored search results, which are given the highest ranking on some websites in exchange for payment by the company or other search result so listed) are given the highest ranking based on algorithms that calculate which websites have received the greatest amount of web traffic using the same or similar search terms as the one(s) being used by the searcher-user.

Figure 1:
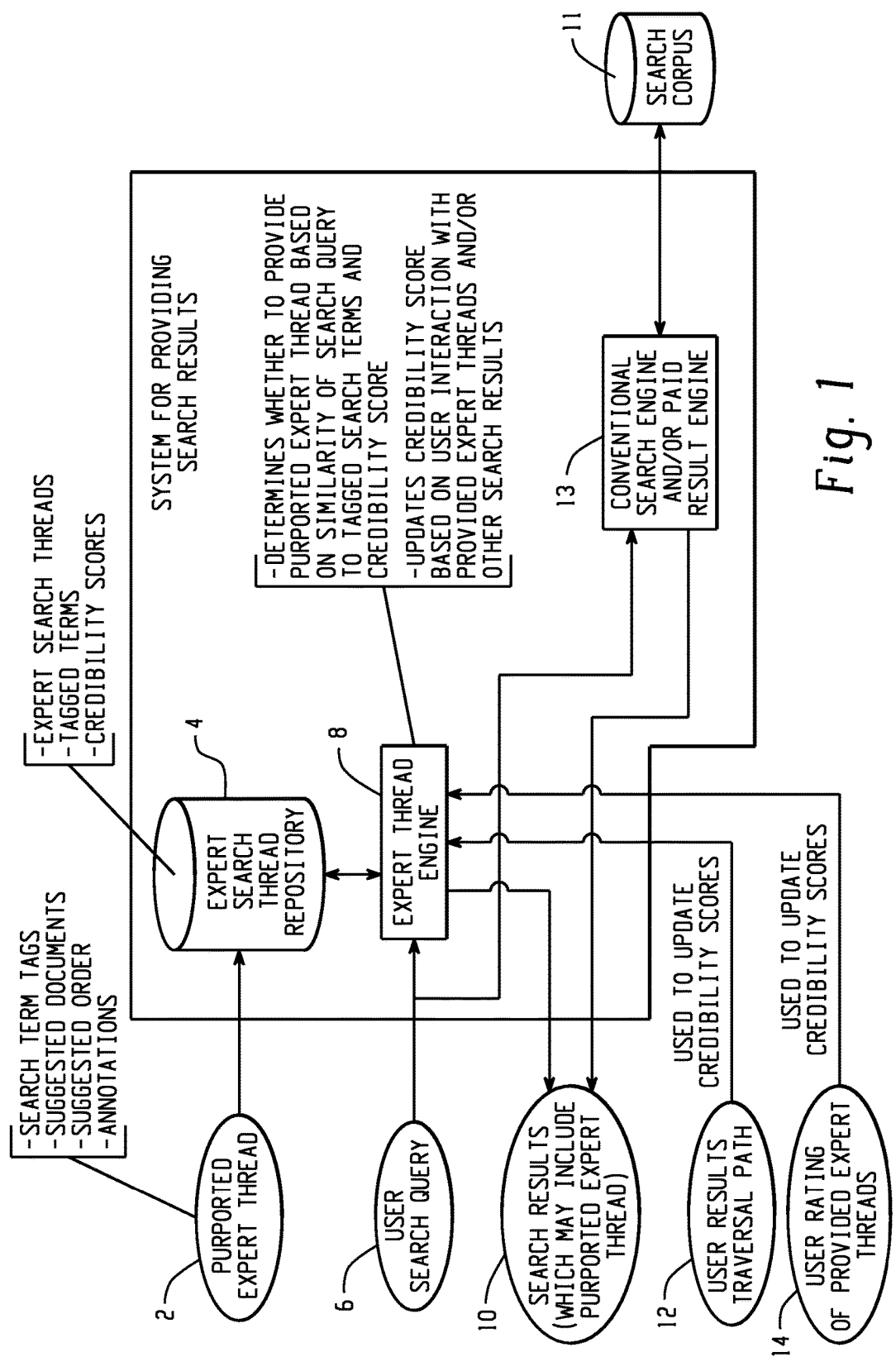
FIG. 1 is a block diagram depicting an example system for providing search results.

FIG. 1 is a block diagram depicting an example system for providing search results. In a system or method of providing a search solution, an expert inputs a suggested thread 2 of materials that he thinks will best inform a reader as to a particular topic. The expert's suggested thread 2 may also include an order in which the expert thinks that the identified materials should be reviewed for optimal understanding. An expert annotation engine may further allow the expert to notate, highlight, crop or create clips of search results (e.g., of search results containing image, audio or video files) within a suggested expert thread, and to provide comments, suggestions, guidelines, and the like for navigating the expert thread or any search result within the expert thread.

In one example, upon identifying himself as a purported expert that will be providing a suggested thread 2 for review of a topic, the expert performs a search utilizing one or more search terms. The search terms used for the expert's search are noted by the system as tags for the expert's thread, where when a later user performs searches utilizing those tagged terms, the expert's thread may be suggested to the subsequent user. Upon receiving search results, the expert marks or otherwise identifies all or a portion of the results as being relevant to the topic at hand. The expert may further organize the search results into one or more suggested orders for review. The expert may order the marked search results based on a variety of criteria, such as macro to micro, deductive, inductive, chronological in terms of which site a user should look at first, second, third, etc. The expert search thread 2 is provided to an expert search thread repository 4 for storage.

After submitting a suggested search thread 2 associated with a set of search terms, a determination is made as to the quality of the submitted search thread through observation of subsequent users' interactions with search results for the same or similar set of search terms. The more often that subsequent users use the expert's suggested thread 2 or follow a path similar to the expert's thread 2, the higher the level of credibility is given to that expert thread. For example, in one embodiment, a subsequent user performs a search 6 using search terms that are very similar to the tagged terms associated with the expert's thread 2. An expert thread engine 8 deems the subsequent user's search terms 6 to have a similarity score of 0.9 on a scale of 0-1. If the user is provided the expert's thread 2 along with other results 10 extracted from a search corpus 11 by a conventional search engine or paid result engine 13 and follows the thread exactly, as detected at 12, then the expert credibility level for that search is at its highest possible level (e.g., 1.0 on a scale of 0-1.) If the subsequent user instead opts to traverse a path of returned results on his own 12, the credibility score for the expert's thread will be somewhat less than 1 (unless the subsequent user independently follows the exact thread path suggested by the expert). If the subsequent user follows a results review path 12 similar to the expert's suggested path, then the credibility for the expert thread may be in the 0.75 range, while if a significantly different path 12 is executed by the subsequent user (e.g., different materials reviewed in a different order), then the credibility score may be quite low for that search (e.g., 0.2). Based on the similarity of the subsequent user search terms to the tagged terms for the expert's thread and the credibility score for the expert's thread determined via the subsequent user's browsing path 12, a credibility value is determined for the expert's thread for that search. A composite credibility value for the expert's thread is maintained, such as in the expert search thread repository 4, based on a collection of data for all subsequent users' searches using query terms similar to the terms associated with the expert's thread.

That composite credibility value associated with an expert's thread 2 is used to determine whether that expert's thread 2 should be suggested to subsequent users, and when that expert's thread is to be suggested, the positioning of that expert's thread 2 among other experts' suggestions. A system of providing a search solution may seek to provide the best expert thread as the top expert thread result for a subsequent user who has performed a query using terms similar to those associated with suggested expert threads. If a particular expert thread has been reliably followed by many other users who have performed searches using similar terms, it is likely that that particular expert thread is credible and will be helpful to the current searching user.

In one example, a computer system providing search results receives a search query containing one or more search terms or keywords. A determination is made as to the similarity of the search terms and tagged terms associated with one or more expert threads. Based on similarity scores between the search terms and the tagged terms for expert threads and composite credibility scores of the expert threads, a determination of which expert threads should be provided to the searching user and an order for those expert threads. For example, the expert threads may be ranked based on a product of the similarity score of the expert thread to the current search terms and the composite credibility score for that expert thread. A top n expert threads are then provided as suggested expert threads for the user to traverse.

In addition to providing the new user with suggested expert threads to traverse, the system may monitor the actual path of user browsing to further update the composite credibility scores for the expert threads. This continual updating of the credibility scores may further strengthen expert thread suggestions. For example, if an expert thread becomes outdated, as fewer and fewer subsequent users follow that expert thread, that expert thread will be recommended less and less or not at all.

In addition to adjusting credibility scores based on search result traversal paths of subsequent users, credibility scores for expert threads could be based on a variety of other factors. For example, a credibility score may be adjusted based on a user ranking or other user feedback of suggested expert threads 14. For example, when a user finds an expert thread to be helpful, the user may 'like' or provide a 'thumbs up' to that expert thread, while unhelpful suggested expert threads could be down-voted or otherwise provided a low score. Such recommendations or poor reviews could be incorporated into the composite credibility score for the rated expert threads. The adjustment to the credibility score could further be augmented based on an identified expertise level of the rating user (e.g., a fellow expert's high rating of a thread could be valued highly, a novice user who found an expert thread particularly helpful could be highly valued).

Experts can be provided incentives to expend the effort to generate expert search threads through presentation of their expert search threads on a results page. For example, certain biographical information associated with an expert who designs an expert search thread can be included with a listing of the expert search thread on a results page. Information such as the expert's name, contact information, biographical information, or a link to a webpage associated with the expert or a business associated with the expert can be included with the expert's search thread. In this way, the expert can generate notoriety and publicity through the generation of expert search threads, where users who are provided highly rated expert search threads are likely to further investigate the experts who generated those threads, generating interest in the expert and traffic to the expert's web pages.

In addition to providing benefits to experts who generate expert search threads, a search engine that provides expert search threads can generate revenue through providing such threads for users to traverse. For example, advertising can be displayed on user interfaces that provide expert search threads for users to traverse. Advertisers who wish to have their advertisements displayed pay for such advertisements in a variety of ways, such as on a cost per action basis (e.g., cost per 1000 impressions, CPM, cost per click through). A search engine provider can charge different "cost per" rates for different user interface displays. For example, a search engine provider may charge a rate (e.g., $0.60 per 1000 impressions) for a first display that lists all of the expert search threads associated with a user search. The display that lists all expert search threads may be considered valuable because it will be provided to all users who enter the search terms.

In one example, when a user clicks a link to one of the listed expert search threads, that user is directed to a second level display that lists details of the expert search thread that they have selected. Advertising may also be provided on the second level display, where advertisers are charged a rate for displaying advertisements on the second level display according to the rank of the expert search thread in the set of expert search threads provided to the user, a credibility score associated with the expert search thread, or other metric associated with the quality of the expert search thread. Thus, a first listed expert search thread may have advertising on its second level display that is provided for an advertiser at first rate (e.g., $0.60 per 1000 impressions), while advertising on expert search threads listed lower on the results is charged a lower rate (e.g., $0.20 per 1000 impressions for the tenth ranked expert search report). In this manner, the search engine provider can discriminate the costs charged to advertisers according to a value associated with the user interfaces being provided to the user.

A. Search Results Interface.

A results page may include a set of hyperlinks listed in much the same way current search results are presented (i.e., hyperlinks to each expert's thread associated with the search terms or keywords input by a user, with the URL and introductory/overview text about the topic or subject matter covered presented below each hyperlink).

Additionally, a set of expert search thread (e.g., Thread-Search™) search results might appear as follows: After a user inputs search terms and keywords into a search bar, one set of results appearing on the search results page will list organic/natural search results (i.e., those whose placement is uninfluenced by money or any other factor other than relevance) in the form of hyperlinks (e.g., organized in descending order from the most visited websites to the least visited websites) associated with those search terms and keywords. Another set of results appearing on the search results page will list paid search hyperlinks or ads (i.e., where the highest or otherwise highlighted positions are given to those who have paid a premium price for higher placement than organic/natural search results) associated with those search terms and keywords. Still another set of results appearing on the search results page will list expert search thread hyperlinks associated with those same search terms and keywords.

The actual placement of these expert search thread hyperlinks can vary—they can appear alongside or above organic/natural and paid search results, or below paid search results but above organic/natural search results, or as a daughter window, pop-up window or the like associated with either/both the organic/natural search results and the paid search results. There could also be prompts offered by the search engine alerting the user to the existence of expert search thread hyperlinks related to the particular search being performed, or a button or other means of turning on/off the expert search thread feature such that when this setting is turned on/activated by a user, the expert search thread hyperlinks appear together with organic/natural and paid search results). In one example, the expert search threads are provided as a separate category of search results from the two dominant categories in existence today (i.e., organic/natural search results and paid search results).

Figure 2D:
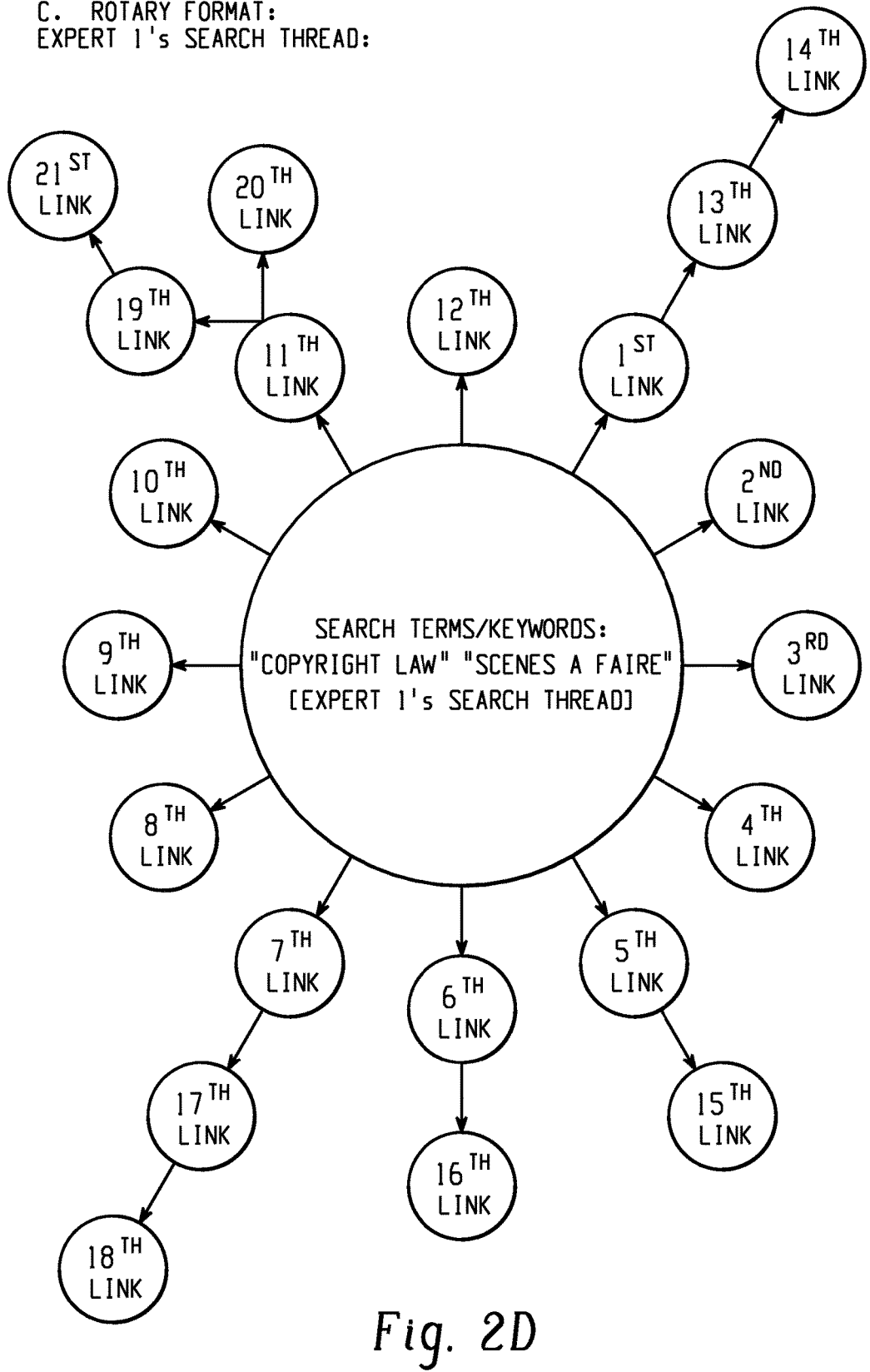

For example, currently, if a user inputs the search terms "copyright law" and "scenes a faire" into a search bar, the search results currently presented show a list of hyperlinks associated with those search terms/keywords (i.e., the organic/natural search results), with a link to the Wikipedia entry for "Scènes à faire" appearing first (i.e., at the top of the list), followed by an article entitled "SCENES A FAIRE UNDER COPYRIGHT LAW" authored by an attorney, followed by a link to a PDF of an article entitled "Software and scenes a faire" written by Jones Day attorneys, and so on. At the bottom of the first page of these search results is a single ad related to the search terms/keywords entitled "Copyright Registration," which is highlighted both by its placement at the bottom below the organic/natural search results and by a colored background that sets it apart from the rest of the display page, which has a white background. The expert search thread search results could appear alongside the organic/natural and paid search results currently displayed or be otherwise highlighted/set apart from those search results (e.g., by placing them to the right of the search results currently displayed and with a different colored background), and displayed/presented as hyperlinks to each expert's thread (e.g., in descending order of popularity in terms of how often an expert's thread is accessed in connection with the search terms/keywords being searched). Once a user clicks on the link to a particular expert's thread, that thread might appear in (1) a list mode (e.g., listing from top to bottom each link in that expert's thread in the order that expert recommends viewing each such link), or (2) a graphic mode—where an icon, number or other placeholder for each link in that expert's search thread is presented horizontally, vertically, or otherwise spatially (e.g., using concentric circles, a Venn diagram, a "breadcrumbs" format, a timeline format, a flowchart or other hierarchical format, a clock-like format, or other visual format that shows the order in which a user might drill down into a particular topic or subject matter, similar to "breadcrumbs" or navigational guideposts such as arrows or some other indicator of the vector/direction of the expert's recommended navigation/drill-down through his recommended/curated search results). Several example organizations of search results are included herewith as FIG. 2.

B. Example Use Case.

Currently, a Google search using the search terms "copyright law" and "scenes a faire" yields a set of initial results, in order of their appearance on the results page, as shown in FIG. 3. Those initial results include:

A Wikipedia entry for "scenes a faire," which provides a two-sentence description of the doctrine, followed by two examples and three cases in which the doctrine was asserted as an affirmative defense.

A brief article written by an attorney, which focuses entirely on the Ninth Circuit Court of Appeals decision in *Ets-Hokin* v *Skyy Spirits, Inc.*, et. al. (without even a case citation to that case).

An article written by Jones Day attorneys back in May 2009 proposing how the scenes a faire doctrine might be applied to computer software cases.

A legal dictionary definition provided by an obscure online dictionary called Durhaime.org based in Canada (which appears to be a marketing tool for that firm), which contains a one-sentence (and woefully incomplete) definition of the scenes a faire doctrine.

A 2006 article available through LexisNexis entitled "Copyright, Originality, and the End of the Scenes a Faire and Merger Doctrines for Visual Works" (which can only be accessed by paying a fee of $15+tax).

At the bottom of the initial search results page, there are two paid search ads, the first of which is an ad offering trademark registration for $149, and the second being an ad by LegalZoom.com offering copyright registration services. Neither of these paid search results appears to have anything to do with the scenes a faire doctrine.

Using the expert search thread feature, by contrast, in addition to the above-described organic search results (plus any paid search results), a search results page might yield the following initial results—i.e., links to the search threads of the top ranking experts:

[Expert 1's search thread link]
  Jeffrey D. Brandstetter—Entertainment & Intellectual Property Attorney, Law Offices of Jeffrey Brandstetter, San Francisco, Calif.
[Expert 2's search thread link]
  Matthew W. Johnson—Registered Patent Attorney/Senior Associate, Jones Day, Pittsburgh, Pa.
[Expert 3's search thread link]
  David Nimmer—Copyright law expert and law professor; Of Counsel at Irell & Manella, LLP, Los Angeles, Calif.; has updated/revised *Nimmer on Copyright* since 1985
[Expert 4's search thread link]
  Paul Goldstein—Copyright law expert and law professor at Stanford University; Of Counsel at Morrison & Foerster; author of *Goldstein on Copyright*
[Expert 5's search thread link]
  William F. Patry—Copyright law expert and Senior Copyright Counsel at Google; former Professor of Law at Benjamin N. Cardozo School of law; author of *Patry on Copyright*

When, for example, a user clicks on Expert 1's search thread link, the following search thread might be displayed (which could well include additional entries beyond the initial five included below):

1. Scènes à Faire
  http://www.answers.com/topic/scenes-faire
  scène à faire [sen a fair], a French term for the kind of scene within a drama towards which the preceding action seems inevitably to tend, such as the crucial encounter between hero and villain.
  [NOTE: Although this entry merely copies/pastes entries from other sources (e.g., Oxford Dictionary, Wikipedia, etc.), it provides a good brief introduction to the scène à faire doctrine by presenting those multiple entries on a single "snapshot" page.]
2. What's a Scènes à Faire?
  http://www.concurringopinions.com/archives/2013/03/whats-a-scenes-a-faire.html
  The scènes à faire doctrine is an exception to copyright protection. It emerged in the 1940s, not coincidentally only a few years after the merger of law and equity in federal courts after the 1938 adoption of the Federal Rules of Civil Procedure. The term itself was first used in an opinion by . . .
  [NOTE: The partial sentence copied above (which is highly relevant to the topic being searched) is a snippet cropped by the expert of this thread from the fourth paragraph appearing at this URL, as opposed to the first partial sentence of every URL typically listed on the search results page following an organic search (e.g., performed on Google), which may or may not be relevant to the topic searched.]
3. Copyright, Originality, and the End of the Scenes a Faire and Merger Doctrines for Visual Works
  http://papers.ssm.com/sol3/papers.cfm?abstract_id=900148
  The scenes a faire doctrine complements the merger doctrine by providing that certain subject matter—stock images, tried and true story lines, fables and folklore, scenes of nature, common visual and cultural references, all of which fall under the description of scenes that must be done—are not copyrightable because they are part of the public domain and no one can obtain a monopoly on such images by putting them into a fixed and tangible medium of expression.
  [NOTE: This entry is included fairly high up in the presentation order of search results because it succinctly describes both the merger doctrine and the scènes à faire doctrine, two separate doctrines that, although distinct from one another, are so interrelated as to require an understanding of the interplay between the two.]
4. Scènes à Faire
  http://www.photosecrets.com/scenes-a-faire
  "Scènes à faire . . . a principle in copyright law in which certain elements of a creative work are held to be not protected when they are mandated by or customary to the genre."
  [NOTE: Good overview in chart form of links to key cases applying the scènes à faire doctrine and significant opinion language from each case.]
5. Scènes à Faire
  http://itlaw.wikia.com/wiki/Scenes_%C3%A0_faire
  Scènes à faire refers to "incidents, characters or settings which are as a practical matter indispensable, or at least standard, in the treatment of a given topic."
  [NOTE: A good brief description with case authority regarding the scènes à faire doctrine as it applies to computer programs.]

Systems and methods for acquiring and providing expert search threads can take a variety of forms. In one example, a portion of a system acquires expert threads from experts. That portion of the system enables a user to mark/identify all or a portion of their search results regarding one or more topics (e.g., manually enter or enter manually); organize those search results into various orders or search threads (e.g., macro to micro, deductive, inductive, chronological in terms of which site a user should look at first, second, third, etc., as a taxonomy or an ontology [or both]); and identify themselves as the expert or super user who compiled those search threads (e.g., the more other users use or follow an expert's thread, the higher the ranking/search result placement that expert receives in the search results displayed whenever the same or related search terms or keywords are used in a search query by another user, or whenever a similar or related subject matter or topic is suggested by the search terms or keywords used in a search query by another user).

Another portion of a system provides search results to users. In one example, a computer system is configured to receive a search query containing one or more search terms or keywords; responsive to the search query, provide search results related to such search query including providing one or more expert search threads for a user to traverse.

In one example, the search results providing portion of a system can be configured to aid an expert in designing an expert search thread. The system can be configured to allow an expert to create a search thread combining a set of search results together by marking or otherwise identifying select search results and organizing such search results in an order designated by the expert (e.g., in order of importance, such that the first result is the first item a user new to the subject matter or topic should read/view first, the second result is the second item of importance or the second item a new user should read/view, etc.; or as an ontological taxonomy, where each link is placed in one or more hierarchies created by the expert [such as "intellectual property>copyright law> infringement>affirmative defenses>scenes a faire doctrine," and "visual arts>photography>protecting works>copyright> merger doctrine"], and relationships across taxonomies are also shown [for example, connecting the scenes a faire doctrine and the merger doctrine showing that the two are closely related). The system can further be configured to allow the expert to notate, highlight, crop or create clips of search results (e.g., of search results containing image, audio or video files) within a search thread, and to provide comments, suggestions, guidelines, and the like for navigating the search thread or any search result within a thread. In one example, a system is further configured to enable the expert to underline, highlight, bold, italicize, bracket, mark or otherwise distinguish or set apart webpage text or other portions of search results (e.g., images, audio or video clips, or cropped or clipped portions thereof, including run times, start and end times or positions along an audio or video scrollbar, or the like) [similar to Evernote Web Clipper].

A system may be configured to generate expert search threads that contain a series of links that a user is recommended to follow. In other examples, a system is further configured to enable the expert to export some or all of the expert's search thread content (e.g., hyperlinks, webpage text, images, audio or video clips, etc.), in whole or in part (e.g., clipped or cropped), to a single document or other repository, which users can access by clicking on the expert's search thread, and which lists or otherwise organizes the expert's search thread content in an order or format selected by the expert. For example, upon clicking on an expert's search thread (i.e., one of the results returned in response to a search performed by a user), the user might see a list of 25 links, listed in the order they should be viewed, which links include entire articles with select text highlighted by the expert, clipped text (without the surrounding text in the original webpage or article from which the text was clipped), cropped image, audio and video files (showing only those portions that the expert deems relevant), clipped audio and video files (showing the relevant start and end run times within those files), etc.

Upon viewing and/or utilizing an expert search thread, a user may be provided an opportunity to rate each search thread according to various criteria (e.g., the more other users use or follow an expert's thread, the higher the ranking/search result placement that expert's search thread receives in the search results displayed whenever the same or related search terms or keywords are used in a search query by another user, or whenever a similar or related subject matter or topic is suggested by the search terms or keywords used in a search query by another user, or according to the ranking of expert threads as determined by users in the aggregate. Ratings from multiple users may be compiled into a composite score for an expert search thread.

In one example, certain user's ratings are weighted disproportionately to others (e.g., expert users' ratings (i.e., peer reviews) are weighted higher than regular user ratings). Weighting of select users' rating of expert threads can be based on a variety of criteria, including a user's: (a) own background (e.g., personal or professional information that suggests an expertise or deeper understanding of the same or similar topic(s) or subject matter being searched, such as an attorney who practices intellectual property law); (b) familiarity with the topic or subject matter being searched (e.g., as extrapolated from the user's site profile or other publicly available information); or (c) ratings (either system generated or those generated by other users) received in connection with the same or other searches (analogous to a seller's reputation or feedback score/rating on eBay).

Each expert's search thread is then displayed in accordance with its respective rank based on the ratings. Whenever other users input search terms or keywords related to a subject matter or topic in a search query similar to the subject matter or topic of the search conducted by the expert in creating their search thread. While in some embodiments, expert search threads can receive higher placement in results, highlighting, or other means of distinguishing relative to other search results (i.e., relative to other experts' search threads, organic/natural search results, paid search results, or other search results), based on payment of a premium price or other consideration. However, in other systems, such payments may not be permitted to avoid any tainting of the meritocracy of the system.

Figure 4A:
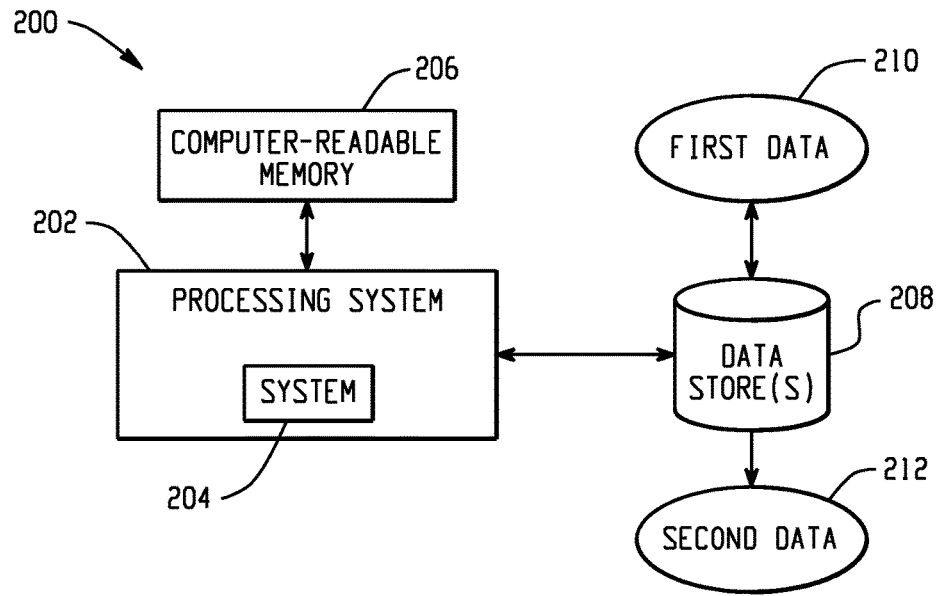
FIGS. 4A, 4B, and 4C depict example systems for use in implementing a system for providing expert search results.
Figure 4B:
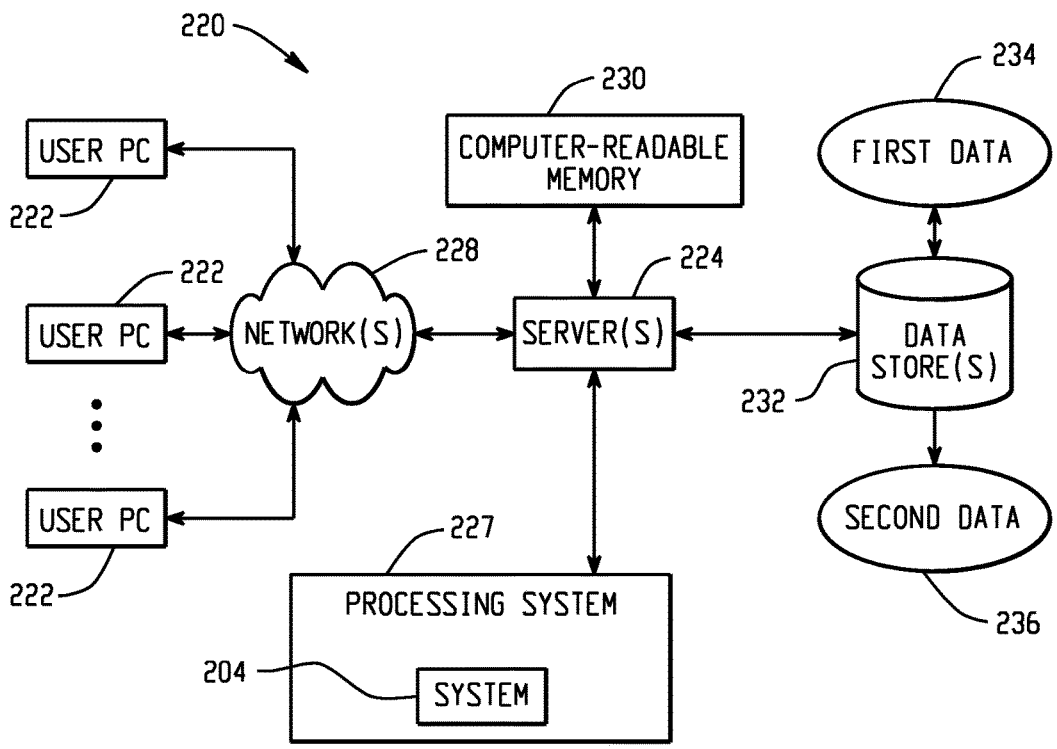
Figure 4C:
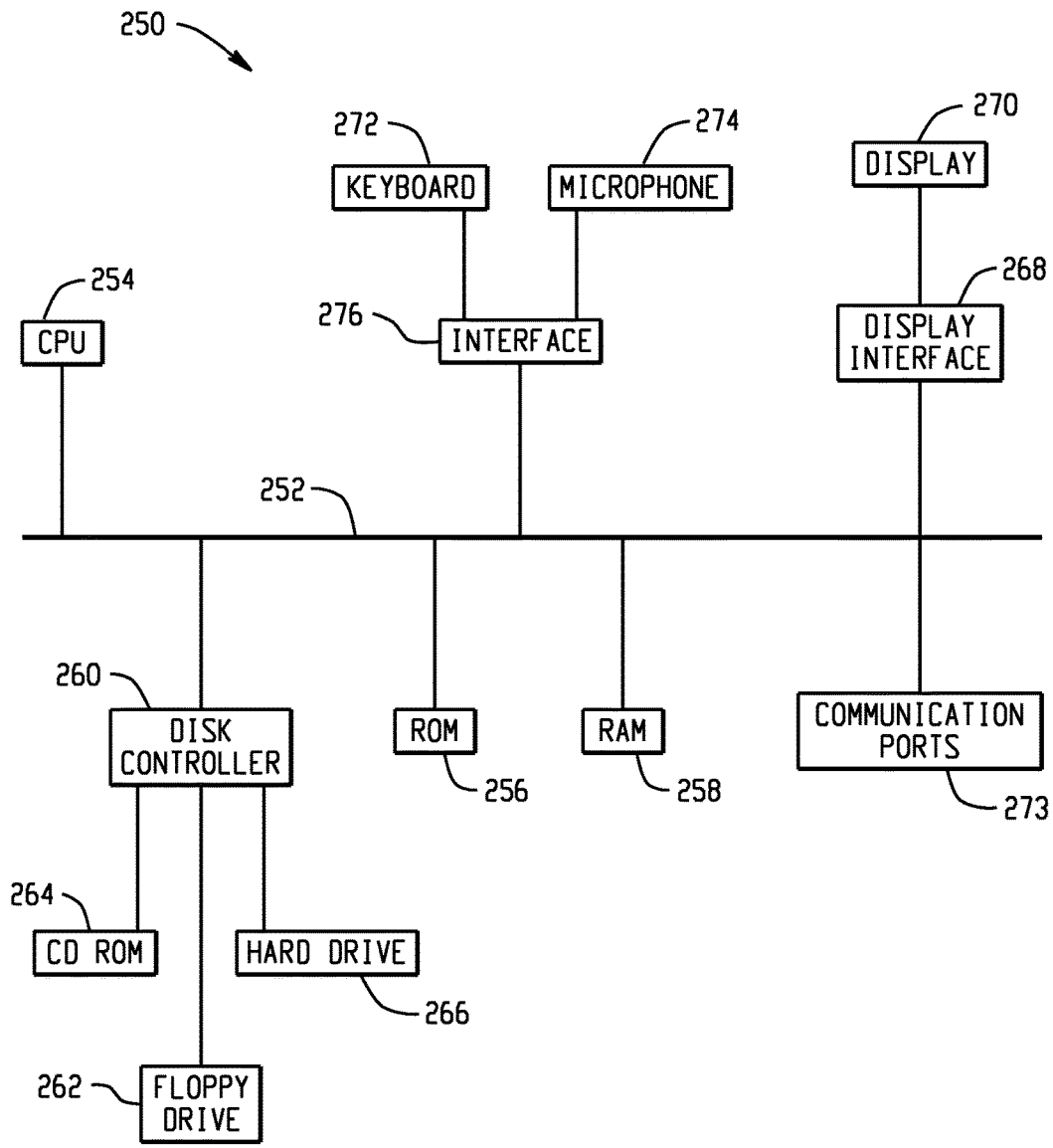

FIGS. 4A, 4B, and 4C depict example systems for use in implementing a system for providing expert search results. For example, FIG. 4A depicts an exemplary system 200 that includes a standalone computer architecture where a processing system 202 (e.g., one or more computer processors) includes a system 204 being executed on it. The processing system 202 has access to a computer-readable memory 206 in addition to one or more data stores 208. The one or more data stores 208 may contain first data 210 as well as second 212.

FIG. 4B depicts a system 220 that includes a client server architecture. One or more user PCs 222 accesses one or more servers 224 running a system 226 on a processing system 227 via one or more networks 228. The one or more servers 224 may access a computer readable memory 230 as well as one or more data stores 232. The one or more data stores 232 may contain first data 234 as well as second data 236.

FIG. 4C shows a block diagram of exemplary hardware for a standalone computer architecture 250, such as the architecture depicted in FIG. 4A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors) may perform calculations and logic operations required to execute a program. A processor-readable storage medium, such as read only memory (ROM) 256 and random access memory (RAM) 258, may be in communication with the processing system 254 and may contain one or more programming instructions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for providing search results, comprising:
receiving, using a data processing system, an expert search thread associated with a search term from an expert, wherein the expert search thread includes an identification of a plurality of network links entered manually via a user interface by the expert that the expert identifies as being helpful to learning about a topic associated with the search term;
after the expert search thread is received, receiving, using the data processing system, a first query from a first user based on the search term; and
providing, using the data processing system, a set of results to the first query that includes a link to the expert search thread, the link positioned in the set of results according to a credibility score determined based on ratings of the expert search thread by a plurality of users, the expert search thread including the plurality of network links that the expert identified as being helpful to learning about the topic that the expert had previously entered manually.

2. The method of claim 1, wherein the expert search thread further includes an order of the plurality of network links, manually entered by the expert, that the expert identifies as being optimal for viewing the plurality of network links to learn about the topic.

3. The method of claim 1, wherein the users have been provided with sets of results that include the expert search thread.

4. The method of claim 3, wherein the credibility score is a weighted average of the ratings provided by the plurality of users, wherein weights are determined based on levels of expertise associated with users providing the ratings.

5. The method of claim 1, further comprising determining a placement of the expert search thread among other expert search threads.

6. The method of claim 1, wherein the expert search thread is associated with an additional tagged term, wherein the second query is based on the search term and an additional search term, and wherein the method further comprises:
determining a similarity score based on: the set of the search term and the additional tagged term and the set of the search term and the additional search term, wherein determining whether the expert search thread should be included in the expert search thread is further based on the similarity score.

7. The method of claim 1, wherein the expert search thread is provided as an ordered list of network links to suggested documents.

8. The method of claim 7, wherein the expert search thread further includes annotations from the expert who created of the expert thread.

9. The method of claim 1, further comprising:
providing the user interface for creating the expert search thread, wherein the user interface is configured to receive an identification of a level of expertise or details of the expert search thread.

10. The method of claim 1, wherein the expert search thread is provided with a listing of organic search results and paid search results in response to the first query.

11. The method of claim I, further comprising:
determining a credibility score for the expert search thread;
receiving a second query from a second user based on the search term;
determining a placement of the expert search thread in a set of results for the second query based on the credibility score for the expert search thread; and
providing the set of results for the second query to the second user.

12. The method of claim 1, wherein selection of the expert search thread by the first user expands the expert search thread result to show details of the expert search thread.

13. The method of claim 12, further comprising:
displaying an advertisement with the set of results; and
displaying a second advertisement with the details of the expert search thread, wherein a party providing the set of results is compensated for displaying the advertisement and the second advertisement.

14. The method of claim 12, further comprising:
providing attribution to the expert along with the link to the expert search thread or along with the details of the expert search thread.

15. The method of claim 14, wherein the attribution includes an expert name, expert contact information, an expert biography, a link to an expert webpage, or a link to a webpage of a business associated with the expert.

16. The method of claim 12, wherein the details of the expert search thread include additional information created or authored by the expert in addition to the network links.

17. The method of claim 1, further comprising providing the user interface.

18. A computer-implemented system for providing search results, comprising:
a processing system comprising one or more data processors;
a non-transitory computer-readable medium encoded with instructions for commanding the processing system to execute steps comprising:
receiving an expert search thread associated with a search term from an expert, wherein the expert search thread includes an identification of a plurality of network links entered manually via a user interface by the expert that the expert identifies as being helpful to learning about a topic associated with the search term;
after the expert search thread is received, receiving a first query from a first user based on the search term; and
providing a set of results to the first query that includes a link to the expert search thread, the link positioned in the set of results according to a credibility score determined based on ratings of the expert search thread by a plurality of users, the expert search thread including the plurality of network links that the expert identified as being helpful to learning about the topic that the expert had previously entered manually.

19. The method of claim 1, further comprising:
tracking an identity of the first user;
wherein a credibility score for the expert search thread is adjusted based on the identity of the first user who was provided the set of results to the first query that includes the link to the expert search thread.

20. The method of claim 19, wherein the credibility score for the expert search thread is increased or decreased based on an access of the expert search thread by a first user compared to access of the expert search thread by a second user.

21. The method of claim 20, wherein the first user is deemed to have expertise on a topic associated with the expert search thread.

22. The method of claim 19, wherein an amount of adjustment is based on an association between the first user and the expert.

23. The method of claim 22, wherein the amount of adjustment is based on a closeness of the association between the first user and the expert.

24. The method of claim 23, wherein a close relationship between the first user and the expert results in a diminished adjustment of the credibility score.

25. The method of claim 19, wherein the credibility score for the expert search thread is increased more based on a rating of the expert search thread by a first user compared to access of the expert search thread by a second user, wherein the first user is deemed to have an expertise on a topic associated with the expert search thread.

26. The method of claim 1, wherein receiving the expert search thread comprises:
receiving particular search results of a particular query entered by the expert;
receiving a selection of a plurality of individual results of the particular search results from the expert;
receiving an indication of ordering of those selected individual results from the expert, wherein the selection of the plurality of individual results and the ordering of those selected individual results defines the expert search thread.

27. The method of claim 1, wherein one of the network links of the expert search thread is a link to another expert search thread.

28. The method of claim 1, wherein the network links are Internet links comprising addresses of web pages.

29. The method of claim 8, wherein the annotations include a narrative.

30. The method of claim 29, wherein the plurality of network links are interspersed within the narrative.

31. The method of claim 1, wherein the link to the expert search thread is a prompt that provides a mechanism for accessing the expert search thread.

32. A computer-implemented method for providing search results, comprising:
receiving, using a data processing system, an expert search thread associated with a search term from an expert, wherein the expert search thread includes an identification of a plurality of network links entered manually via a user interface by the expert that the expert identifies as being helpful to learning about a topic associated with the search term;
after the expert search thread is received, making the expert search thread available for access by a search engine;
wherein, based on a first query from a first user based on the search term, a set of results to the first query is provided, wherein the set of results includes a link to the expert search thread, the link positioned in the set of results according to a credibility score determined based on ratings of the expert search thread by a plurality of users, the expert search thread including the plurality of network links that the expert identified as being helpful to learning about the topic that the expert had previously entered manually.

33. The method of claim 32, wherein the set of results includes a link to the expert search thread and a link to a second expert search thread, wherein placement of the expert search thread among other expert search threads is determined based on a credibility score of the expert search thread or a similarity score based on the search term.

34. The system of claim 18, wherein the system is configured to provide the user interface.

35. A non-transitory computer-readable medium encoded with instructions for commanding a processing system to execute steps for providing search results comprising:
receiving an expert search thread associated with a search term from an expert, wherein the expert search thread includes an identification of a plurality of network links entered manually via a user interface by the expert that the expert identifies as being helpful to learning about a topic associated with the search term;
after the expert search thread is received, receiving a first query from a first user based on the search term; and
providing a set of results to the first query that includes a link to the expert search thread, the link positioned in the set of results according to a credibility score determined based on ratings of the expert search thread by a plurality of users, the expert search thread including the plurality of network links that the expert identified as being helpful to learning about the topic that the expert had previously entered manually.

36. A computer-implemented method for providing search results, comprising:
- determining, using a data processing system, a location of an expert search thread associated with an expert that is formed by an entity receiving the expert search thread from the expert, wherein the expert search thread includes an identification of a plurality of network links entered manually via a user interface by the expert that the expert identifies as being helpful to learning about a topic associated with the search term, wherein the location of the expert search thread is determined after the expert search thread is received from the expert;
- providing, using the data processing system, a set of results to a query that includes a link to the expert search thread, the link positioned in the set of results according to a credibility score determined based on ratings of the expert search thread by a plurality of users, wherein the expert search thread includes the plurality of network links that the expert identified as being helpful to learning about the topic.

37. A computer-implemented method for providing search results, comprising:
- determining, using a data processing system, a location of an expert search thread associated with an expert that is formed by an entity receiving the expert search thread from the expert, wherein the expert search thread includes an identification of a plurality of network links entered manually via a user interface by the expert that the expert identifies as being helpful to learning about a topic associated with the search term, wherein the location of the expert search thread is determined after the expert search thread is received from the expert;
- displaying, using the data processing system, the expert search thread according to a credibility score determined based on ratings of the expert search thread by a plurality of users, wherein the expert search thread includes the plurality of network links that the expert identified as being helpful to learning about the topic.

38. A computer-implemented method, comprising:
- receiving, using a data processing system, an identification of a plurality of network sources by a first user that the first user identifies as being helpful to learning about a topic;
- after the first user's identifications are received, receiving a request for data from a second user, using the data processing system; and
- providing, using the data processing system, a set of results to the request, the set of results including links to a plurality of the identified network sources that the first user identified as being helpful to learning about the topic, wherein the links to the plurality of the identified network sources are positioned in the set of results according to a credibility score determined based on ratings by a plurality of users.

39. The method of claim 38, wherein the credibility score is a weighted average of the ratings provided by the plurality of users.

40. The method of claim 38, further comprising:
- tracking an identity of a first user;
- wherein the credibility scores are adjusted based on the identity of the first user, where the credibility scores are adjusted more based on ratings by the first user than ratings by other users.

* * * * *